Aug. 19, 1969 D. A. HAYNES 3,461,729
WHEEL BALANCER PROBE ASSEMBLY
Filed May 2, 1966 3 Sheets-Sheet 1
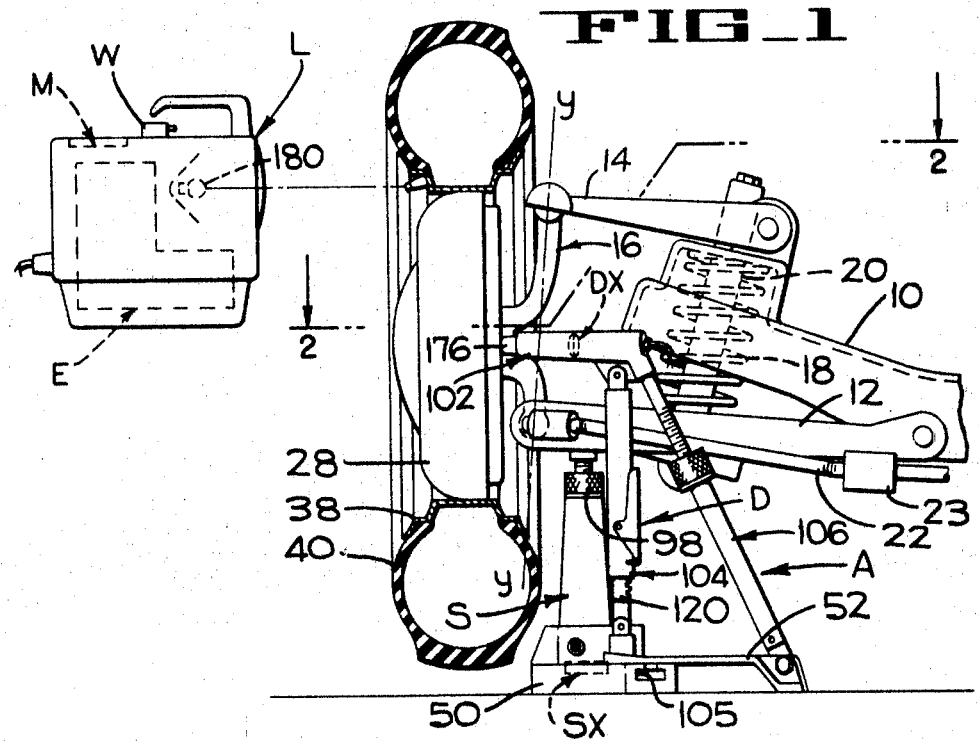
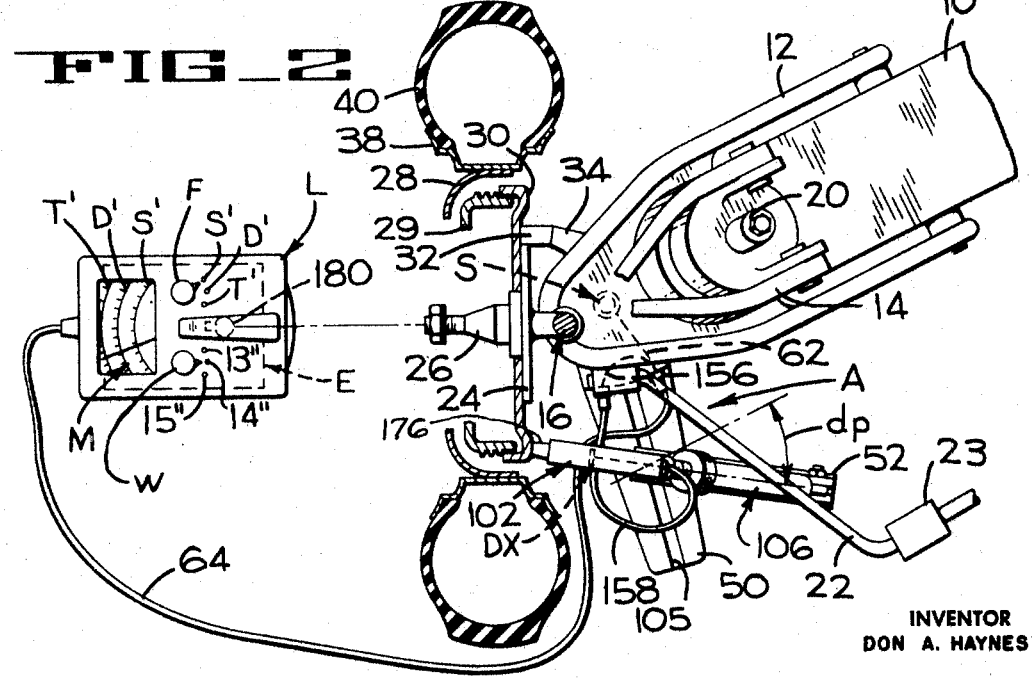
INVENTOR
DON A. HAYNES
BY Francis W. Anderson ATTORNEY

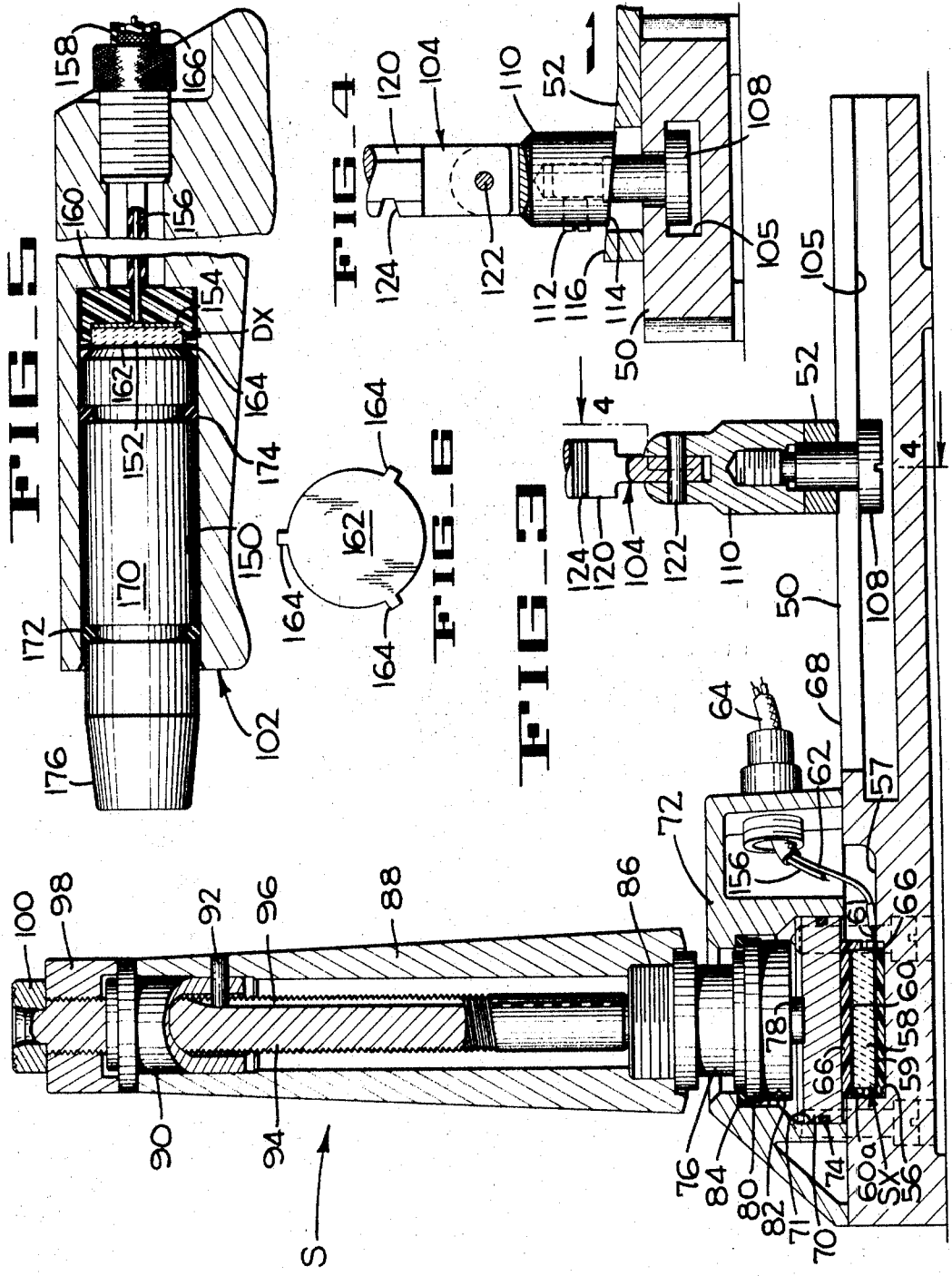

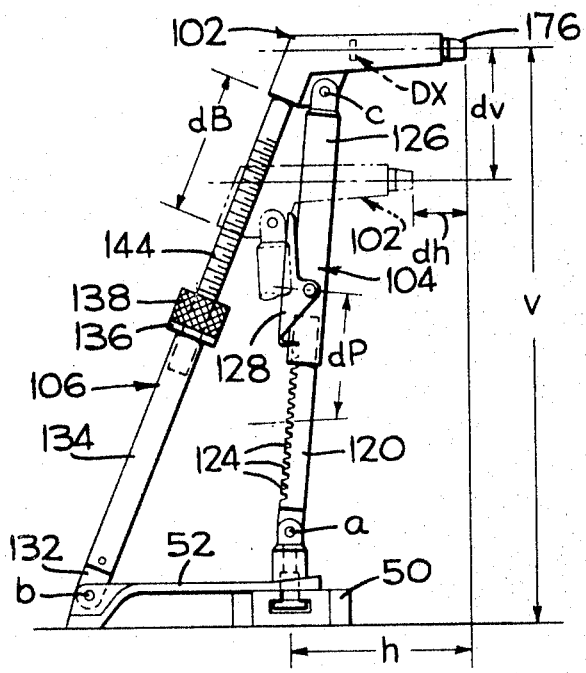
FIG_8
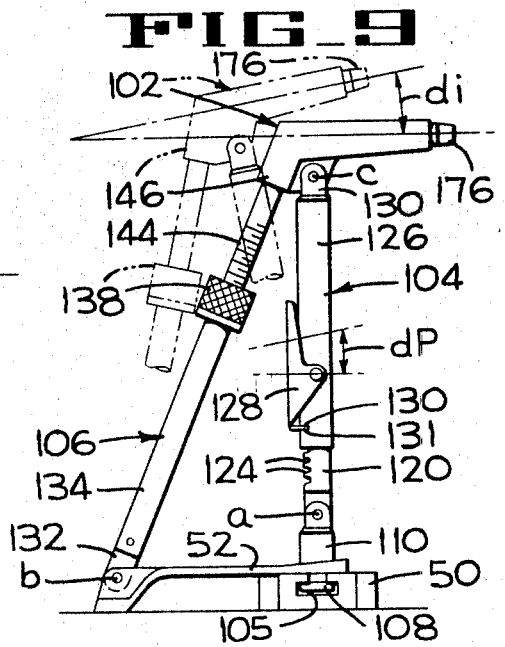
FIG_9
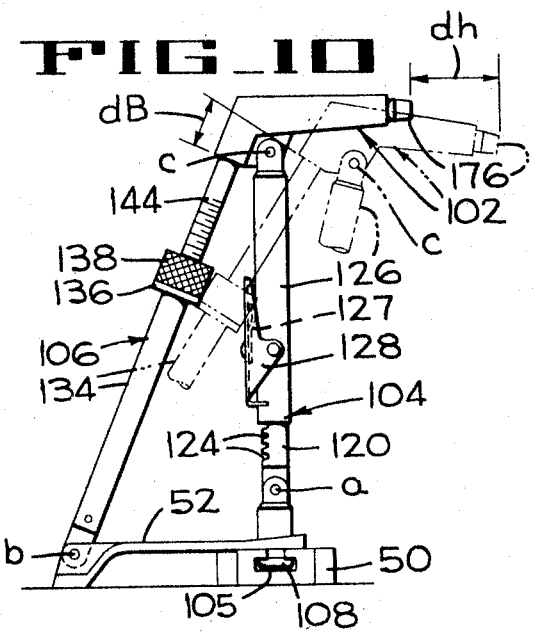
FIG_10
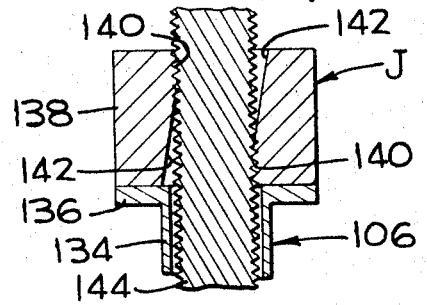
FIG_7
INVENTOR
DON A. HAYNES
BY Francis W. Anderson
ATTORNEY

United States Patent Office 3,461,729
Patented Aug. 19, 1969

3,461,729
WHEEL BALANCER PROBE ASSEMBLY
Don A. Haynes, Okemos, Mich., assignor to FMC Corporation, San Jose, Calif., a corporation of Delaware
Filed May 2, 1966, Ser. No. 546,704
Int. Cl. G01m 1/14
U.S. Cl. 73—457        13 Claims

ABSTRACT OF THE DISCLOSURE

A dual probe assembly having separate transducers for each probe measures both static and dynamic unbalance of a wheel as it is rotated on the vehicle. The probe for measuring the static unbalance is mounted on an adjustable screw jack which supports the axle, or one of the control arms of an "A-frame," or independent suspension linkage. The probe for measuring the dynamic unbalance is mounted on the same base as the jack which supports the dynamic probe. The dynamic probe engages a non-rotating part of the wheel, and is mounted for height and orientation adjustability for accommodation to different vehicles.

---

This invention relates to measuring and testing devices and more particularly to a wheel balancer probe assembly for sensing the static and dynamic unbalance of a rotor such as a steerable vehicle wheel, and sending electric unbalance signals to a computer and indicator unit.

Vehicle wheels (and the term "wheel" includes the tire), are often unbalanced—both statically and dynamically, and since a large proportion of the unbalance is usually found in the tire, as the tires wear or as they are changed or shifted on their rims, the unbalanced conditions change. The static unbalance creates wheel tramp and thumping, whereas the dynamic unbalance in the front or in the steerable wheels creates wheel shimmy or oscillation about the steering axis (i.e., the kingpin or ball joint axis of the suspension). The inter-relation of the factors involved is complex, and hence it is desirable that the static and dynamic unbalance of vehicle wheels of the type described be measured and in fact corrected while the wheels are installed on the vehicle, so called "on-the-car balancing."

In the present invention the measurement of both static and dynamic unbalance is performed by a dual probe assembly which includes separate transducers. The transducer for measuring the static unbalance is embodied in an adjustable screw jack which supports the axle, or more commonly, supports one of the control arms of the "A-frame" or independent suspension linkage; and a dynamic transducer embodied in a probe that is mounted on the base of the static transducer probe. The dynamic probe engages a non-rotating part of the wheel hub or spindle assembly, such as a peripheral portion of the brake backing plate. This engagement is most effectively made in a horizontal plane that passes through the wheel axis, so that oscillation of the wheel about the generally vertical kingpin or ball joint axis will produce the optimum effect on the dynamic probe. (In the specification and claims that follow, and where applicable, the use of the word "probe" or "jack", as the case may be, is intended to include the normally stationary and the relatively movable unbalance responsive parts such as a tube and a plunger and their associated transducer, such as a piezoelectric crystal mounted between the parts.) Thus, with the probe assembly of the invention properly installed and adjusted, with the static unbalance jack underneath a suspension member and with the dynamic unbalance probe engaging a wheel part as described, both the static and dynamic unbalance can be detected and measured.

The dual probe assembly of the present invention is an improvement over the patent to Allen 2,782,641, Feb. 26, 1957; and over the patent to Lowe 2,700,892, Feb. 1, 1955; in a manner which will be apparent as this specification proceeds.

The probe assembly of the present invention is particularly useful in connection with a stroboscope and a computer circuit which measures the unbalance forces developed while the wheel is being rotated on the vehicle and converts these measurements into correction weight values. However, at the outset it is to be understood that the probe of the present invention is not limited for use with the aforesaid circuit.

Features and advantages of the present invention, and improvements over devices such as those of the aforesaid patents are:

(1) The probe assembly is constructed to be universal in its application. The static unbalance jack can be placed under a suspension element to bear the weight on the wheel, with the dynamic unbalance probe against a spindle or a brake plate element in virtually any current model truck or passenger car, without interference with the chassis parts such as suspension arms, springs, sway bars, steering links, etc.

(2) The forces generated by dynamic unbalance can be accurately determined, because the dynamic probe is readily pressed firmly against the nonrotating wheel part. Since the wheel is turned against its stop, any desired degree of preload force can be imparted to the transducer in the dynamic probe by means of a screw mechanism in a brace extending between the base of the unit and the dynamic probe head.

(3) The probe assembly is compact and light. It can be applied first to one wheel and then to the other by merely sliding the base for both probes from one side to the other, and then turning the dynamic probe unit about its axis on the base. The dynamic probe wedges itself in place.

(4) The dynamic probe is a single ended probe, that is, the unbalance responsive element or plunger projects laterally in one direction only, and only a single transducer is required.

The advantages and features mentioned above and the construction of the unit and assembly are closely related. As to this construction, briefly in the embodiment described, the base of the static unbalance jack is formed with a track to support a floor plate that mounts the dynamic probe. The probe proper is mounted on the upper end of a post by a horizontal pivot, and the lower end of the probe is pivotally mounted on the floor plate by a parallel pivot. The post length (height) is quickly adjustable. A screw extendable and quickly adjustable brace extends between the probe and a floor plate pivot.

(5) This construction makes possible a quick adjustment of the dynamic probe while the unit is under the car, and in the following dimensions:

(a) Height of the dynamic probe (both post and brace length adjusted).
(b) Basic probe axis inclination from the horizontal (post length adjustment).
(c) Basic probe position along its horizontal axis (brace length adjustment).

(d) Reorientation of the probe axis about a vertical axis (the floor plate can be turned on the base about a vertical axis).
(e) Translation of the probe in a horizontal plane (motion of the floor plate along the track in the base of the static jack).

Of course, the entire unit can be slid along the floor, that is, in the horizontal plane as mentioned in (3)

above. Actually, adjustments (a), (b) and (c) are not entirely independent.

(6) Another feature of the advantages is that rapid means are provided for a coarse adjustment in the brace that firmly presses the probe against the wheel element (and hence also holds the wheel element against its steering stop), for setting up the unit for measuring dynamic unbalance.

The manner in which these and other features and advantages of the present invention may be obtained will be apparent to those skilled in the art from the following description of a preferred embodiment of the invention and the accompanying drawings.

In the drawings:

FIGURE 1 shows the probe assembly of the present invention fitted to the right front wheel of an automobile, having an independent front suspension of the control arm or "A-frame" type. The view is from the front of the vehicle and the wheel is shown straight ahead, for simplicity of illustration.

FIGURE 2 shows the test setup taken on the lines 2—2 of FIGURE 1, except that in this view the wheel has been turned about its steering axis and against its stop.

FIGURE 3 is a longitudinal vertical section through the jack and base plate with most of the dynamic probe unit broken away.

FIGURE 4 is a fragmentary section of the dynamic probe assembly taken on line 4—4 of FIGURE 3.

FIGURE 5 is an enlarged vertical section through the dynamic probe head.

FIGURE 6 is a plan of the crystal retaining washer.

FIGURE 7 is an enlarged vertical section at the screw adjustment of the dynamic probe brace.

FIGURE 8 is a diagrammatic side view of the probe showing the basic height adjustment.

FIGURE 9 is a similar view showing the basic adjustment for the inclination of the dynamic probe axis.

FIGURE 10 is a similar view showing the basic adjustment for the inclination of the dynamic probe head in the horizontal plane.

TYPICAL SUSPENSION

Referring to FIGURES 1 and 2, the probe assembly A of the present invention is shown set up for testing the unbalance of the right front wheel on an independently sprung front suspension vehicle, such as an automobile. The suspension illustrated is merely representative of any one of a number of suspensions to which the probe is adaptable, as will be apparent to those skilled in the art when the construction of the probe assembly is described in detail.

The vehicle has a frame cross member 10 mounting a lower control arm 12 and an upper control arm 14. These pivotally mount the front wheel hub spindle 16 for steering about the generally vertical axis $y$—$y$ in the conventional manner, as well as for the suspension motion. The steering mechanism is not shown. The lower control arm 12 supports the frame member 10 by a spring 18, and a shock absorber 20 of conventional design is also illustrated. Also shown is a conventional sway bar 22 which is secured at each end to the lower control arm 12, and has a pivotal mounting 23 on a frame portion not shown in the drawings.

As seen in FIGURE 2, the wheel hub and spindle 16 is of the modern ball joint construction, and has a hub flange 24 and a spindle shaft 26 for mounting the front wheel bearings of a wheel 28 and its brake drum 29. The hub portion of the wheel and brake drum, and front wheel bearings are omitted in FIGURE 2, these being conventional, and their details not being critical to the invention. The flange 24 of the wheel spindle 16 has the usual provision for mounting the brake backing plate 30, this being a nonrotatable portion of the wheel for mounting the brake shoes (not shown). A wheel steering stop includes a stop member 32 on the brake backing plate, which stop is shown pressed against a mating stop member 34 on the lower control arm 12. This condition is necessary for the measurement of dynamic unbalance, unless other means restrain steering of the wheel, such as friction of the tire of the other front wheel against the ground. In FIGURE 2, as mentioned, the detachable hub portion of the wheel has been broken away, as has the hub of the brake drum 29 which normally mounts the wheel 28 in accordance with conventional design. The wheel 28 includes a drop center tire rim 38 mounting a pneumatic tire 40. It is well known in the art that a given amount of unbalance has a dynamic effect which depends upon the nominal wheel diameter, which is usually given as the diameter of the axial bead seats of the tire rim 38, and as explained in the aforesaid copending application, means are provided in the computer circuit for setting up the circuit in accordance with this nominal wheel size of the vehicle.

In some vehicles, the steering knuckle projects forwardly from the spindle. In this case the dynamic probe can be lower than in FIGURE 2, for pressing against the knuckle. In other cars the probe can also be lower than shown in FIGURE 2 when engaging the brake backing plate.

STATIC PROBE CONSTRUCTION

The construction of the probe assembly A of the present invention will now be described in detail. The unit includes a base 50 which rests upon the floor and mounts a static probe or jack S, as well as a floor plate 52 for the dynamic probe assembly D. (The static probe S is a "jack" only in the sense that it supports the vehicle, it does not lift the vehicle.) The construction of the static probe or jack S appears in FIGURE 3. The base 50 has a circular recess 56 formed in the upper space thereof for receiving the disc-like static unbalance load cell or transducer SX. The recess has a lead accommodating extension 57. The active element, in the form shown, is a piezoelectric lead zirconate, lead-titanate ceramic crystal 58, silvered on both sides for making contact with conductor washers 59, 60. The upper washer 60 has three tabs 60a (like that of FIG. 6) for making a ground connection with the base. The lower washer 59 has a tab 61 soldered to a lead 62 which runs through a shielded output cable 64. The shield of the cable is the ground lead. The cable 64 sends static unbalance signals to a computer circuit built into a stroboscope unit L, seen in FIGURES 1 and 2. The crystal is cut for compressive loading on its flat faces, and in the example given may be in the order of one and one-half inches in diameter and one fourth inch thick. The crystal is encapsuled in a plastic case 66 formed of upper and lower cups with notched rims. The upper face of the case projects above the upper face 68 of the base 50 so that the crystal can support the weight of the wheel during the test.

The weight of the wheel and static unbalance forces are transmitted to the crystal assembly SX by an adjustable height screw jack assembly which permits limited tilting about a nominal vertical axis to accommodate some relative motion in the horizontal plane of the support point on the control arm 12 and the floor. The tilting does not affects the signal.

The load cell SX supports an "equalizing" washer 70 freely slidable in a bore 71 formed in a housing 72 screwed to the base 50. An O ring 74 in the washer 70 excludes dirt and moisture. This washer makes a nice fit with the bore 71, so that it acts as a free piston, and yet cannot be appreciably canted and used so as to load the crystal eccentrically.

In order to transfer the load to the washer 70, a stud 76 is provided with a pedestal portion 78 about a half inch in diameter and resting on the washer 70. The stud 76 is flanged at 80, which flange has a clearance of 0.005 to 0.010 inch, or so, with a bore 82 in the housing 72. This construction permits free but limited inclination of the jack. An O ring seal washer 84 excludes dirt and moisture.

The upper end of the stud 76 is threaded at 86 to receive a pedestal sleeve 88 having an internal sleeve 90 pinned in the upper end of the sleeve by means of a pin 92. A jackscrew 94 is threaded into a nut 98 and is slotted as at 96 to receive the end of the pin 92. This prevents rotation of the jackscrew but permits it to move up and down. The jackscrew is raised and lowered by the knurled adjusting nut 98 that seats on the upper end of the stationary sleeve 90. The upper end of the jackscrew has a swiveled head washer 100 for engaging the suspension. Thus, with the construction shown, both the weight of the vehicle and static unbalance loads are transmitted to the load cell SX through the jackscrew 94, the nut 98, the sleeve 88, the stud 76, and the washer 70. Slight changes in the position of the axis of the jackscrew 94 during set-up or operation of the device are accommodated by the clearance between the flange 80 and the housing recess 82, without affecting force transmission to the load cell.

DYNAMIC PROBE

The dynamic probe assembly D is shown in a number of figures of the drawing. The assembly includes the probe head proper 102, an adjustable length supporting post 104 and an adjustable length brace or screwjack 106 connected between the floor plate 52 and the probe head. The post 104 (FIGURES 3 and 4) is mounted in a T slot 105 on the base 50 for the static probe, by means of a headed screw 108 threaded into a tightener foot 110 and locked by a set screw 112 (FIGURE 4). The lower face 114 of the tightener foot is beveled to mate with the inclined upper wedge face 116 of the floor plate 52. Thus, manual force on the plate 52, in the direction of the arrow of FIGURE 4, will tighten up the assembly just described.

The post 104 is adjustable in length, and so is formed of telescoped rod and tube parts. A support rod 120 is pivoted at 122 between ears in the upper end of the foot 110. The rod is formed with notches 124 along its length. The post 104 also includes a support tube 126 slidable over the rod 120 and carrying a spring closed, manually operated latch 128. The latch spring 127 is shown in FIGURE 10 in dotted lines. The latch 128 is pivoted to the support tube 126 and the latter is slotted at 130 to receive the latch tooth 131. This tooth enters one of the slots 124 in the rod 120, and hence holds the post in its adjusted position. The upper end of the post tube 126 mounts a yoke 130 having ears which pivotally mount at c, the probe head 102.

The post 104 alone does not determine the test position of the probe head 102. This also depends on the effective length of the brace or thrust assembly 106, which is adjustable. The assembly 106 includes a yoke 132 pivoted at b to the outer end of the floor plate 52. Pinned to the yoke 132 is a brace tube 134 which projects upwardly and is flanged at its upper end at 136 (FIGURE 7). Resting on the flange 136 is a quick-release nut 138 that is partially threaded at 140 and partially relieved at 142 by a diagonal bore. The threaded portions of the nut 138 mate with the threads on a thrust rod 144, which rod is secured (non-pivotally) within a socket 146 in the rear of the probe 102 and to the rear of the pivot c, mounting of the probe on the post assembly 104.

The interior of the probe head 102 is shown in an enlarged scale in FIGURES 5 and 6. The probe head has a bore 150 for receiving the dynamic load cell DX. The load cell includes a crystal 152, like the static load crystal 58, except that it is of smaller diameter, namely about one half inch, and thinner, namely about one tenth of an inch thick.

The crystal 152 makes electrical contact with a thrust washer 154 which is soldered to a lead 156 forming one wire of the two conductor cables 158. The lead 156 extends through the static probe housing 72 (FIG. 3) and into the cable 64 leading to the stroboscope unit L (FIGURE 2). The contact thrust washer 154 (FIG. 5) seats in a plastic insulating cup washer 160 that bottoms in the bore 150 in the probe housing. The outer face of the crystal 152 is held in position against the washer 154 by a conductive spring retainer washer 162 having radial ears 164 (FIG. 6) that make an electrical ground connection with the wall of the bore 150. The probe housing 102 is electrically connected to a braided shield 166 which forms the other signal lead or common ground connection to the stroboscope unit L, via the housing 72 of the static probe assembly, and a braided shield (not shown) around the two wires in the cable 64 (FIG. 2).

The initial (preload) force, and the dynamic unbalance forces developed during the test are transmitted to the load cell crystal 152 by means of a plunger 170 that slides freely in the bore 150 of the probe housing and is sealed by O rings 172, 174 with the bore. The nose 176 of the plunger is pressed against the brake backing plate (FIGURES 1 and 2) by means of the brace or jackscrew 106 during the initial setting up of the assembly for the test.

FIGURES 8, 9 and 10 show three basic adjustments accommodated by the linkages, latches, etc., just described. In FIGURE 8, the plunger nose 176 is shown in solid lines a vertical distance v above the floor (FIG. 18). It can be lowered a distance dv by adjusting both the post latch 128 and the brace adjusting nut 138. By releasing the latch 128 and sliding the tube 126 down over the rod 120, the latch can be lowered a distance dp, thereby shortening the post 104. Similarly, by operating the quick-release screw 138, the brace post 106 can be quickly shortened by a distance dB. These adjustments can be performed simultaneously, one with each hand. The screw 138 can be released by first lifting on the probe head slightly, cocking the screw and permitting the bore 142 (FIGURE 7) to slide along the threaded brace rod 144. when the screw 138 is repositioned, as shown in FIGURE 7, it will automatically lock in position. When the plunger nose 176 is firm against the brake backing plate or the like, preloading pressure against the dynamic load cell DX can be applied by rotating the nut 138. This pressure will firmly press the wheel stop 32 against the suspension stop 34 (FIGURE 2) and preload the dynamic load cell DX for accurately measuring variations in the force applied to that cell due to dynamic unbalance during the test. The adjustment shown in FIGURE 8 is one wherein the axis of the dynamic probe 102 is maintained in a horizontal position. Actually there is no requirement that the axis of this probe be horizontal. The important feature being that the probe extends generally laterally.

In FIGURE 9, the axis of the probe is changed by an angle di. This can be accomplished by manipulating the latch 128. In this case, the latch is raised from a position in the solid lines to another position (shown by a lateral broken line) through a distance dP, to lengthen the post 104. This raises the probe and changes its angle of inclination as indicated. The nut 138 need not be manipulated for this operation. The adjustment also retracts and raises the probe nose 176, but the base 50 can be moved along the floor, or the entire probe can be lowered, as explained with reference to FIGURE 8.

In FIGURE 8, the height adjustments when made, were made so as to maintain the probe axis horizontal. This necessarily resulted in a displacement dh of the plunger nose 176 from a reference line, such as a vertical line through the pivot a of the post. In other words, a small change in horizontal position of the probe indicated at dh was provided. If a larger change in dh is desired, this can be accomplished quickly as shown in FIGURE 10. Here, the brace adjustment nut 138 is released and the brace 106 lengthened a distance dB, and this positions the plunger nose 176 in a more forward position, as shown in the broken lines in FIGURE 10. Of course, in practice, one or all of the combinations of the adjustments shown in FIGURES 8 to 10 will be made.

When the quick-release brace or thrust nut 138 is tightened to press the dynamic probe against the wheel, a backward reaction is produced againts the pivot *b* of the brace 106 on the floor plate 52, thereby producing the wedging action at inclined faces 114, 116 and shown by the arrow in FIGURE 4. This tightens up the assembly during the test. In use, the brace 106 will be grasped and urged in the direction of the arrow to tighten these parts initially.

In addition to the motions shown in FIGURES 8 to 10, the post 104 can be swiveled about its vertical axis on the base 50, to point the dynamic probe in the desired direction, and to cause it to point either to the right or left, depending upon which wheel is being tested. Also, the floorplate 52 can be slid along the T slot 105 in the base 50, to translate the dynamic probe along the base, and the entire base 50 itself can be positioned on the floor as required. Thus, for positioning both probes, particularly the static probe, review of FIGURES 1 and 2 shows how various interfering parts can be missed or accommodated with a probe assembly of this invention, and yet at all times the dynamic probe crystal can be forced against the wheel parts, and under a preload sufficient to insure that force variations due to dynamic unbalance will be sensed and translated into electric signals.

As mentioned, the details of the stroboscopic and electronic circuits associated with the present invention are not critical to the probe assembly. A typical unit is shown in FIGURES 1 and 2. The stroboscopic unit L, with modern transistorized circuits, can be a single housing embodying the electronic circuit board or chassis E. The unit L includes a meter M having a scale T' which is a tachometer scale, a scale D' reading dynamic unbalance and a scale S' reading static unbalance. A function switch F selects S', D' or T' as desired. Since variations in wheel diameter are preferably set into the instrument, a wheel size switch W is also included and this is calibrated in rim diameter, e.g. 13", 14", 15", etc.

The unit L also includes a rare gas lamp 180 (FIGURE 1) which flashes in synchronism with each wheel revolution. Thus, a chalk mark on the wheel (or the valve stem) can be observed, and its angular position noted each time the lamp 180 is fired by the electronic circuit during the test. This gives the position of the wheel for an unbalance measurement.

In operation, and with the suspension shown in the example, the wheel is jacked up until the lower control arm 22 will clear the static probe jack S. The wheel is turned against its stops 32, 34 (FIG. 2). The jack is then slid under the lower control arm and the nut 98 is adjusted so that the jack supports the tire clear of the floor. When the jack is thus positioned, the floor plate 52 and the dynamic probe D are also positioned so that the plunger 176 of the dynamic probe will engage the brake backing plate or other wheel hub member, as close to the periphery of the member or the backing plate as is possible. It is also desirable that the plunger engage the brake backing plate (for example) as close to the horizontal plane through the spindle shaft 26 as is possible, to provide optimum readings. The electronic circuit E will be calibrated in conjunction with the wheel diameter switch W on the basis that there is some relation between the wheel size and brake backing plate size (for example). In some cars, the dynamic probe can press against a steering knuckle, not shown.

The quick release unit is turned to press the probe nose 176 forward against the wheel part. The wheel is spun with the usual wheel spinner (not shown), the tachometer scale T' indicating the equivalent m.p.h. with switch F set at T'. The calibration knob W is set to the wheel size and the function switch set to position S, the static unbalance test position. Meter scale S' now reads the amount of static unbalance (ounces), and note is taken of the angular position of the valve stem or chalk mark, as viewed by the stroboscope lamp 180.

The wheel is now stopped and positioned at the noted angle. A correction weight equal to one half of the total unbalance is applied to each rim flange at the top of the manually positioned wheel.

The test is repeated and the static unbalance correction is trimmed, if necessary.

For correcting dynamic unbalance, the wheel spinner is again used and the function switch F is set to position D. The reference mark is observed under the lamp and the angular wheel position noted as the lamp flashes. The wheel is stopped, scale D is read, and the two correction weights applied. The scale can be calibrated to give the value of the individual weights. One weight is applied over the inboard tire rim flange adjacent the dynamic probe head, but in a horizontal plane through the wheel axis. The other weight is applied in the same plane on the outboard rim flange, 180° from the inner weight. The test is repeated, as required until the wheel is balanced. This repeat of the test removes spurious weight value readings caused by non-standard wheel and tire conditions, variations from the ideal probe position, etc. The wheel can always be acceptably balanced dynamically.

To balance the other wheel, the control arm is jacked up with the separate vehicle jack and the brake assembly freed. The other control arm is raised by the vehicle jack, the base 50 slid across the floor, the floor plate 52 and dynamic probe assembly turned a half turn on the base, and the set-up completed as described.

Having described a preferred embodiment of the invention so that those skilled in the art may practice the same, I claim:

1. A combined static and dynamic probe unit for measuring the unbalance of a vehicle wheel; said unit comprising a base; a static unbalance sensing jack probe assembly mounted on the base for engaging the vehicle suspension; a generally vertical post, means mounting said post on said base for pivotal motion in the vertical plane, a dynamic unbalance probe head, means mounting said probe head on an upper portion of said post for engaging a non-rotatable wheel part, an adjustable length brace connected between said dynamic probe head and said base, thrust means in said brace for forcing the probe head against the non-rotatable wheel part; and a transducer in each probe.

2. The unit of claim 1, wherein means are provided for adjusting the length of said post, and wherein said dynamic probe head mounting means is a pivot.

3. The unit of claim 1, wherein said adjustable brace comprises telescoping members, and said thrust means comprises a quick-release nut for adjusting the length of the brace to press the dynamic probe head against the non-rotatable wheel part.

4. The unit of claim 3, wherein said post comprises telescoping members and a latch for locking them in their adjusted relative positions.

5. The unit of claim 4, wherein said dynamic probe head mounting means is a pivot.

6. A combined static and dynamic unbalance measuring probe unit comprising a base, a static unbalance sensing jack projecting up from said base, a transducer in said jack; a floor plate having one end on said base and the other end formed for resting on the floor, means mounting said one end of the floor plate for both rotation on and translation along said base; a post pivotally mounted on said floor plate at said one end thereof; a dynamic unbalance sensing probe head pivotally mounted on the upper end of said post, a transducer in said probe head; and an adjustable length brace connected between said other end of said floor plate and said probe head.

7. The unit of claim 6, wherein one end of said floor plate has for an upper wedge surface formed thereon and facing the other end of the plate, said floor plate mounting means having a complementary wedge surface.

8. The unit of claim 7, wherein said base has a T-slot extending from said jack, said floor plate mounting means comprising a headed bolt slidable in said slot.

9. The unit of claim 6, wherein said adjustable length brace comprises telescoping members, and a quick-release nut for lengthening the brace and advancing the dynamic probe head.

10. The unit of claim 9, wherein said post comprises telescoping members, and a latch for locking the members together.

11. The unit of claim 6, wherein said post comprises telescoping members, and a latch for locking the members together.

12. A combined static and dynamic probe unit for measuring the unbalance of the steerable vehicle wheel; said unit comprising a base, a static unbalance sensing jack probe on said base for engaging the vehicle suspension, a support member mounted on the base, a dynamic unbalance sensing probe assembly mounted on said support member, a brace connected between said support member and the base to hold the dynamic unbalance sensing probe in sensing engagement with a non-rotatable wheel part, said brace adjustable in length and inclination for changing the height and orientation of the dynamic unbalance sensing probe, and a transducer in each probe.

13. The static and dynamic probe unit of claim 12 for measuring the unbalance of a steerable vehicle wheel having a turn radius stop in which said brace is adjustable for engagement with a non-rotatable wheel part when the wheel is against the turn radius stop.

References Cited

UNITED STATES PATENTS 2,782,641  2/1957  Allen _____ 73—457

JAMES J. GILL, Primary Examiner

HERBERT GOLDSTEIN, Assistant Examiner